United States Patent
Rasband et al.

(10) Patent No.: US 9,793,947 B2
(45) Date of Patent: *Oct. 17, 2017

(54) SCALABLE PROTOCOL FOR LARGE WSNS HAVING LOW DUTY CYCLE END NODES

(71) Applicant: TYCO FIRE & SECURITY GMBH, Neuhausen am Rheinfall (SZ)

(72) Inventors: Paul B. Rasband, Lantana, FL (US); Stewart E. Hall, Wellington, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 302 days.

This patent is subject to a terminal disclaimer.

(21) Appl. No.: 13/828,475

(22) Filed: Mar. 14, 2013

(65) Prior Publication Data
US 2013/0243038 A1   Sep. 19, 2013

Related U.S. Application Data

(63) Continuation-in-part of application No. 13/826,704, filed on Mar. 14, 2013.

(60) Provisional application No. 61/612,801, filed on Mar. 19, 2012.

(51) Int. Cl.
*H04B 1/713* (2011.01)
*H04W 8/00* (2009.01)
*H04W 72/04* (2009.01)
*H04W 84/18* (2009.01)

(52) U.S. Cl.
CPC ............ *H04B 1/713* (2013.01); *H04W 8/005* (2013.01); *H04W 72/042* (2013.01); *H04W 84/18* (2013.01)

(58) Field of Classification Search
None
See application file for complete search history.

(56) References Cited

U.S. PATENT DOCUMENTS

2007/0014267 A1*  1/2007  Lam et al. ................... 370/338
2007/0258508 A1* 11/2007  Werb et al. .................. 375/140

* cited by examiner

*Primary Examiner* — Jae Y Lee
*Assistant Examiner* — Alan Lindenbaum
(74) *Attorney, Agent, or Firm* — Joseph M. Butscher; The Small Patent Law Group, LLC

(57) ABSTRACT

A method and system are described for providing a wireless sensor network between a main node and a plurality of nodes, the nodes associated with sensors. The method and system define communications channels over which the main node communicates with the nodes based on a channel hopping scheme, and define at least one transfer channel that is dedicated to carrying transfer frames that are broadcast by the main node. The method and system configure non-acquired nodes that are not acquired to the network to enter a connection session by locating the at least one transfer channel to listen for a transfer message. The transfer message indicates a next communications channel that will become active. The method switches the non-acquired nodes to the next communications channel.

25 Claims, 7 Drawing Sheets

SCALABLE PROTOCOL FOR LARGE WSNS HAVING LOW DUTY CYCLE END NODES

CROSS-REFERENCE TO RELATED APPLICATIONS

This application is a continuation in part of U.S. application Ser. No. 13/826,704, filed Mar. 14, 2013, entitled "Scalable Protocol for Large WSNs Having Low Duty Cycle End Nodes", the entire disclosure of which is incorporated by reference herein.

This application claims priority benefit from U.S. Provisional Patent Application Ser. No. 61/612,801, filed on Mar. 19, 2012, the entire disclosure of which is incorporated by reference herein.

BACKGROUND OF THE INVENTION

Embodiments of the present invention generally relate to wireless sensor networks and relate more particularly to methods and systems that implement a series-parallel channel hopping scheme in a wireless sensor network.

Multi-tiered wireless sensor networks (WSNs) exist that are distributed over large geographic areas. Conventional multi-tier wireless sensor networks include a main node (e.g. a coordinator node, or gateway node) that forms a first tier. The main node is logically linked to nodes in a second tier. The nodes in the second tier may be end nodes or repeater nodes. Repeater nodes in a second tier may be logically linked to one or more end-nodes that are in a third tier. The entire collection of end-nodes may comprise a third tier of the network. The IEEE 802.15.4 protocol standard, Version 2 (2006) distinguishes between "fully functional nodes" and "partially functional nodes". Other times nodes are designated using a parent-child relationship (e.g., with the "parent" being a fully functional node such as the main node or a repeater node, and the "child" being a partially functional node such as an end-node). The relationship between the main node and a repeater node may also be referred to as a parent-child relationship, with the repeater serving the subordinate role. Oftentimes the fully-functional nodes, which serve, or are capable of serving as parent nodes, use higher receiver sensitivities and transmitter powers and better channel isolation (i.e., better radios), while end-nodes (which virtually always fill the role of children nodes and are much more numerous in the network) use less costly radios with generally poorer performance. The network described above is in general spread out over a large physical area. For example, two nodes (at least one of which has a low-noise amplifier and power amplifier) can communicate with each other over a distance of several hundred feet with little difficulty, and thus the entire network may cover an area of 100,000 square feet or more, and multiple floors of a building. More general network topologies also exist in which the various network tiers are organized or organize themselves in ad hoc fashion, based on quality of communications links between the various pair combinations of nodes, as determined in tests conducted during the ad hoc network formation. Regardless of the actual network topology, it can be stated that in most practical WSN implementations a given end node (e.g., tier N) finds itself connected solely to some "parent" node one tier above (e.g. tier N-1).

Generally, a wireless sensor network uses channels or frequency ranges spread throughout a larger frequency range prescribed by means, such as governmental regulation. For instance, in the United States a wireless sensor network operating in the 902-928 MHz range may use a set of channels up to 50 in number. Furthermore, the network uses those channels in "random hopping" fashion, such that nodes communicate over a particular channel for only a short period of time (typically a few tenths of a second), before hopping/jumping to another channel. The order of channel occupancy is random, or apparently random.

For many types of communications protocols (e.g., the IEEE 802.15.4 standard protocol), before a node can send a message on a particular channel, the node spends a certain (short) period of time listening for other nodes which might be using the same channel. For example, the 802.15.4 standard specifically uses a type of Carrier Sense Multiple Access—Collision Avoidance (CSMA-CA) algorithm for this "listen-before-talk" process.

However, conventional communications protocols utilized with multi-tier wireless sensor networks experience certain limitations. For example, a common problem often encountered in physically large wireless sensor networks is that there may be two nodes inside the same network and located at two extreme edges of the physical space of that network, which need to send a message at the same moment. If the two nodes are too far apart to hear one another's messages, the nodes may perform the CSMA-CA check and both determine that it is OK to send their respective messages. However, when the two nodes send the messages, other nodes inside the network (most of which are located roughly in between the two extreme nodes) can hear the messages from both of the transmitting nodes. The two messages corrupt one another and thus the nodes in the middle are not able to understand either message. Hence, conventional network protocols are unable to prevent message overlap when not all of the nodes in the network can hear all messages from all other nodes. This is particularly a problem with two end nodes (as opposed to an end node and a gateway or repeater nodes, or two repeater nodes, etc) since end nodes tend to have minimal hardware (e.g. radio transceiver of limited receive sensitivity, and no low-noise amplifier (LNA) for example).

Another general problem in conventional wireless networks relates to the fact that most end-nodes are battery powered, and operate with a low duty cycle, namely the end nodes are in sleep mode a vast majority of the time in order to conserve power. In many cases these low duty cycle nodes "wake up" only when they experience a sensor event (e.g., a motion sensor prompts the awakening of the node). The node then sends any and all appropriate messages and then returns to sleep mode. This leads to a second problem, namely upper-tier management nodes (repeater and gateway nodes) are unable to send network management messages to end-nodes when the end-nodes are in sleep mode a vast majority of the time, such as which channel is currently active. Because an end-node is asleep most of the time, deaf to any management messages from its parent node in the network, and because the end-node wakes up at random times dependent upon events outside of the control of the network, the end node cannot easily track which channel the network is using at any one point in time. Hence, when the end-node does wake up, the conventional approach is for the end-node to conduct a full multi-channel scan to find the network channel in use prior to sending any messages. The full multi-channel scan is extremely expensive from a power perspective. For example, if the network is spending 0.1 seconds on each of 50 channels in pseudo-random hopping, and if the end-node scans backwards in the channel order, it may take 1 or 2 seconds to find the active channel. in accordance with embodiments herein, end-nodes ideally wake up for only a few tenths of a second, a few times per hour or day in order to make coin cell and small rechargeable batteries practical in WSN end-nodes. Hence, a problem exists that end-nodes, after awakening from long periods of sleep, are unable to quickly find the active channel in the network over which the end-nodes are allowed to communicate and waste power finding the active channel. That is, there are cases where end-nodes spend more time and power searching for the active channel in frequency hopping networks than they spend in actually sending and receiving application oriented data.

It is possible that WSNs in the future may one day contain thousands, or perhaps even tens of thousands of end-nodes. The above problems are exacerbated by the sheer number of end-nodes in a very large network, leading to another problem. Conventional network protocols are not well suited to support a very large number of nodes in an extensible way, such as in a way that can theoretically support a nearly unlimited number of end-nodes.

The standard means of avoiding message collision in wireless sensor networks is one of various approaches to "listen-before-talk", such as the CSMA-CA algorithm of the IEEE 802.15.4 protocol. In one optional implementation (i.e., the beacon mode option), the 802.15.4 protocol enables large networks that use channel slotting in which beacon frames are transmitted at intervals with the time space between beacon frames being divided into a number of time slots. The 802.15.4 standard (version 2, 2006, for example) provides for two types of time slots—time slots in the CAP or "contention access period" and time slots in the CFP or "contention free period". The latter cannot be used by any node unless the network coordinator node specifically grants access to the time slot. The former can be used by any node provided that node first employs the anti-collision mechanism—CSMA-CA. CSMA-CA and time slotting methods help manage the competition among nodes for a limited bandwidth, but do not scale well when the size of a network substantially increases (e.g., above a few hundred messages per minute). For example, as nodes are added, the number of slots available is quickly exhausted. Also, great pressure is placed on the main node in a large network, and repeater nodes have a relatively limited role of merely repeating the messages between an end-node and the main node. Repeater nodes do not manage protocol values within the repeater node's immediate network (sub-network). Hence, the resulting network does not scale well.

Alternatively, if conventional direct sequence spread spectrum (DSSS) techniques were used, rather than frequency hopping spread spectrum (FHSS), as a way of allowing multiple nodes to share the band and increasing security, the above problems would still exist. The chip sets must be different enough (differ in chip patterns enough) to guarantee that DSSS bit extraction cannot convolute two informatically different chip sequences. There is a finite number (i.e., ultimate scarcity) of allowed DSSS chip sequences, just as there are a finite number of frequency channels available in a FHSS scheme.

A need remains for an improved WSN that is scalable for use with low duty cycle end nodes.

SUMMARY

In accordance with one embodiment, a wireless sensor network and method are provided that implement a series-parallel channel hopping protocol that adds transfer channels to provide information regarding channel hopping status, thus reducing the channel scanning time required for an end-node awakening from a long sleep. The present protocol expands simply and uniformly with an ever-increasing number of repeater nodes, and can thus be used with networks containing a total of thousands and even tens of thousands of end-nodes. Optionally, the methods may be used with collections of mutually orthogonal DSSS chip sequences (as an alternative to sets of frequency channels). In accordance with an embodiment, a method is described for providing a wireless sensor network between a main node and a plurality of nodes, the nodes associate with sensors. The method comprises defining communications channels over which the main node communicates with the nodes based on a channel hopping scheme pattern, and defining at least one transfer channel that is dedicated to carrying transfer frames that are broadcast by the main node. The method configures non-attached nodes that are not acquired to the network, to enter a connection session by tuning to the transfer channel to listen for the transfer message. The transfer message indicates an active communication channel (e.g., by indicating the channel number of the next channel to be used in the network hopping order). The method switches the non-acquired nodes to the next active communication channel which was specified in the transfer message, listens for a beacon frame, and utilizes the beacon frame (e.g., typically the end of the last byte of the beacon frame) as a timing reference to enable the non-acquired nodes to acquire the network using some series of request and response messages exchanged between the attaching node and the network coordinator, such as those messages specified in the IEEE 802.15.4 standard.

According to certain embodiments, the beacon frame includes, in addition to other fields, the following fields: a) "total number of transfer channels" field indicating how many transfer channels exist b) "transfer channel number" field indicating which channels within the network represent transfer channels and c) priority access number range fields indicating a range of priority access numbers associated with nodes that are authorized to communicate over the network during a super-frame (total set of all time slots) associated with the beacon frame.

The transfer message includes a channel number field indicating a number for a next communications channel to become active. In cases where multiple parent nodes (e.g., the main node and multiple repeater nodes) are divided among multiple transfer channels, the transfer message may also include a field for the identity of the parent node. In such a case the parent node, immediately prior to a channel hop, would switch to its assigned transfer channel and send a message providing its node ID and the channel ID of its next hop. All children nodes assigned to or associated with that parent node would, in order to send or receive a message, go to the parent's assigned transfer channel and await a transfer message whose node ID matched the ID of the parent. Upon hearing that transfer message from its parent, the child node immediately hops to the channel specified by the transfer message. The transfer message may also include the ID of the network to enable a moving or sometimes moving node to communicate with multiple parent nodes, at its discretion, with the assurance that each of these parent nodes is associated with the same network to which the moving or sometimes moving node previously attached. The transfer message may also include the network ID and parent node ID in the case of moving parent nodes (i.e., parent nodes are moving and children nodes and/or end nodes are at permanently or temporarily fixed physical locations), thus allowing children nodes to communicate with the network (main node) in an opportunistic manner (i.e., when a moving repeater node is located nearby). The method includes using the beacon frame, at the non-acquired end nodes and at acquired end nodes, to perform collision free beacon scheduling. The method further comprises utilizing the beacon frames in a carrier sense multiple access—collision avoidance (CSMA-CA) method. The method further comprises defining at least two transfer channels, the main node transmitting transfer frames alternately over each of the transfer channels, or over a transfer channel randomly selected from a pool of transfer channel options in the case where two or more channels have been designated as transfer channels. The method further comprises causing each child node to hop to a next active communications channel designated by its parent node in that parent node's transfer message, and then waiting for a beacon frame on the new active channel.

The method where the channel hopping scheme is under direction of the main node. The method where a first transfer channel is defined for use between the main node and other parent nodes, and a different second transfer channel is defined for use between those other parent (non-main) nodes and their respective children nodes. The method where each parent node is assigned its own transfer channel, or to a particular transfer channel designated for parent node use, by the main node at the time the new parent (usually a repeater) node is associated with the network, or in a subsequent repeater node configuration message from the main node. The method where the transfer message indicates an active communications channel or set of channels associated with a next super-frame that is initiated by a beacon frame. The method where the defining includes defining the main node in a first tier, repeater nodes in a second tier and end nodes in a third tier, each end node being associated with one of the repeater nodes in a parent-child relationship, the method further comprising providing priority access (PA) numbers to repeater/parent nodes in the second tier, and causing end nodes to inherit the PA number of the associated repeater node, or to inherit a PA number which is a function of the PA number of the associated repeater node, utilizing the PA numbers to control access to the network.

The method where the main node and each of the additional parent nodes use a single transfer channel, or are divided among two or more transfer channels by the main node as part of the parent node network attachment and configuration process. Each parent uses its respective transfer channel to send a transfer message to all monitoring children nodes to indicate its node ID and the channel ID of its next channel hop in the random or pseudo-random hopping scheme. The parent node subsequently hops to the next channel and, without sending a beacon frame, listens for a message from a parent or child node for some period of time before switching to the transfer channel again to indicate the next channel in the hopping order.

The method wherein an unattached end-node or parent (repeater) node randomly scans through channels listening for transfer frames of any parent node, and using a predetermined criterion or criteria (e.g., received signal strength above a threshold or maximum received signal strength among several strength values), selects a parent node through which it will try to attach to the network, and subsequently goes to the channel indicated in the transfer message of the selected (high signal strength) parent in order to send a network attachment request message to the selected parent node.

The method where the number of transfer channels and length of transfer frames is chosen in order to assure that on average the total network usage of the transfer channels is essentially the same as the network usage of the non-transfer (hopping sequence) channels, so as to avoid overuse of the transfer channels by the network.

The method where a set of mutually orthogonal direct sequence spread spectrum (DSSS) chip sets/sequences is used over a single constant carrier wave frequency (channel), as an alternative to hopping from frequency channel to frequency channel, in a manner in which frequency hops are replaced with DSSS chip set switches (chip set "hops"), and in which one or a few such chip sets are reserved for transfer messages, enabling DSSS-based variations of all of the applications described in this document for frequency hopping based channel change management and network tracking by low-duty cycle nodes. The method wherein DSSS chip sets are periodically changed according to a DSSS chip set selection scheme (according to some time pattern, or without discernable timing or pattern) and in which such a change is pre-announced using one or a few pre-selected "transfer message" DSSS chip sequences to announce upcoming chip sets/sequences to be used for regular network data messages.

In accordance with an embodiment, a wireless sensor network, is comprised of a main node. The main node is configured to define communications channels over which the main node communicates with the nodes based on a random or pseudo-random channel hopping scheme and to define at least one transfer channel that is dedicated to carrying transfer frames that are broadcast by the main node. The main node is configured to transmit the transfer frames, each of which indicates an active communications channels, and is configured to transmit a beacon frame over the active communication channel and non-attached nodes associate with sensors. The non-attached nodes are not attached to the network. The non-attached nodes are configured to enter a connection session by tuning to the transfer channel to listen for the transfer message. The non-attached nodes are configured to switch to the active communication channel and listen for the beacon frame. The non-attached node is configured to utilize the beacon frame as a timing reference to enable the non-attached node to attach to the network.

In accordance with embodiments herein, end nodes wake up for only a few tenths of a second, a few times per hour or day in order to make coin cell and small rechargeable batteries practical in WSN end-nodes.

Optionally, an end-node attaches to the network using a particular parent/repeater node, but is not permanently associated with the repeater node, and wherein after resting in an energy-conserving (sleep) state for a period of time, the end-node awakens and scans a list of transfer channels (frequency channels for frequency hopping and DSSS chip sequences for DSSS based networks), which frequency channels or chip sequences it previously learned during the network attachment process, and in which the end node then communicates with the main node via the best (highest signal strength) parent/repeater node which may or may not be the same node by which the end-node originally attached to the network. Optionally, the end node uses such a method (i.e., of communicating with the main node via different parent/repeater nodes) to maintain communication with the main node while moving physically through a space covered by a number of (widely separated) repeater nodes.

DETAILED DESCRIPTION

Figure 1:
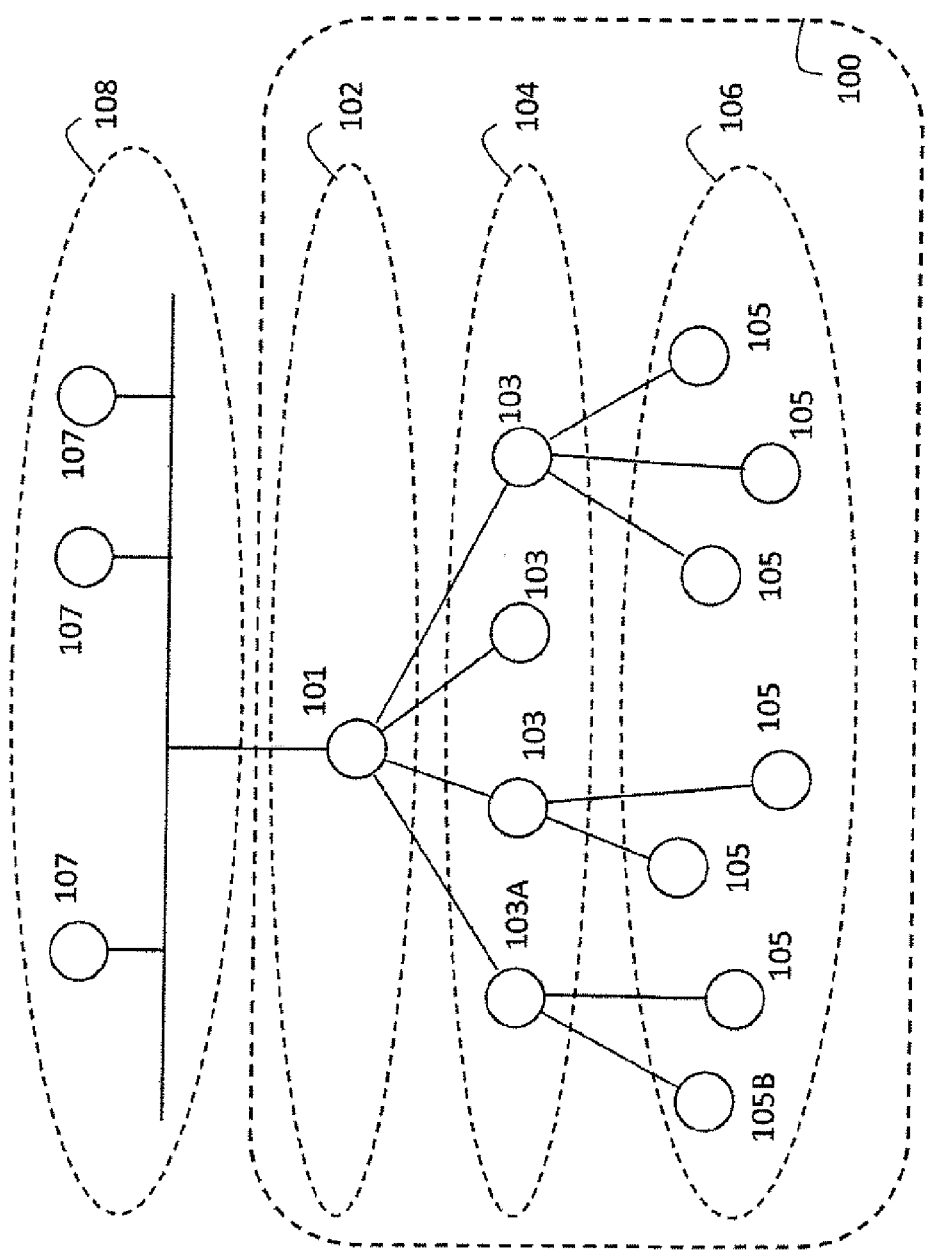
FIG. 1 illustrates a multi-tier wireless sensor network (MT WSN) formed in accordance with an embodiment.

FIG. 1 illustrates a multi-tier wireless sensor network (MT WSN) 100 formed in accordance with an embodiment. The MT WSN 100 includes a main node 101, such as a coordinator node or gateway node that defines a first tier 102. The first tier 102 is logically linked to a second tier 104 that includes parent (e.g., repeater) nodes 103. Some or all of the nodes 103 in the second tier 104 are logically linked to one or more children (e.g., end) nodes 105. The nodes 101, 103 and 105 form wireless node-to-node links. Optionally, repeater nodes may be logically linked to one another. Optionally, the second tier may include one or more end-nodes with linkage to main node 101 and no other linkages to other nodes. The entire collection of children nodes 105 defines a third tier 106 of the network 100. Optionally, more than three tiers may be utilized if repeaters are used on more than one tier (i.e., repeater-to-repeater inter-tier links exist).

In this description, "logically linked" refers to the fact that the two nodes on the respective ends of the node-to-node link are listening specifically for messages which contain an identification number of the opposite node in the link. For example, a parent node 103A is listening for messages sent by a child node 105B, and child node 105B is listening for messages from a parent node 103A. The network described above is in general spread out over a large physical area. For example, two nodes (at least one of which has a low-noise amplifier and power amplifier) can communicate with each other over a distance of several hundred feet at a data rate of 10's or even 100's of kbps with little difficulty, and thus the entire network may cover an area of 100,000 square feet or more, and multiple floors of a building.

The network and methods disclosed herein may be managed using a frequency hopping spread spectrum (FHSS) and/or a direct sequence spread spectrum (DSSS). DSSS is a technique where a data signal is multiplied with a pseudo random noise spreading code. For example, the spreading code in binary language for a "1" may be 10 chips in length ("0011001101"), and these 10 chips in this order constitute one "chip set" or "chip sequence". The receiver is configured to filter for this particular chip set among what appears as transmitted white noise. In DSSS, specific chip sets may be used for communicating messages (such as data messages and transfer messages), and the chip sets may be alternated by the main node 101 and/or a parent node 103 according to a DSSS chip set selection scheme.

As used herein, "channel" and "channel hopping" is used in both FHSS and DSSS methods. A "channel" in FHSS is defined by frequency, and "channel hopping" in FHSS involves switching frequencies, whereas in DSSS, "channel" refers to a chip set/sequence, and "channel hopping" involves changing chip sets/sequences (within a single constant carrier wave frequency).

When a wireless node/radio enabled device wishes to communicate over a wireless network, it must first determine which specific frequency and, potentially, DSSS (direct sequence spread spectrum) chip set, among the various possible allowed alternatives, is being used. This is true whether (1) the node has never used the network and is not a network member and is currently trying to join or "attach" to the network by passing credential and security checks, or (2) the node previously joined the network and is a network member. The process of finding the network (i.e., determining the currently used frequency channel or DSSS chip set based "channel") so as to allow communication with other network nodes is referred to here as "acquiring" the network. If the node has done so in the past, particularly in the case where the node has previously attached to or joined the network, the node may or "re-acquire" the network. That is, "acquiring" or "re-acquiring" a network means determining which FHSS channel or DSSS channel (chip set) is currently active. "Attaching" to a network, in the common usage of the term, means officially joining a network by passing all necessary security and membership regulation requirements. As used herein, "acquiring" a network may refer generally to a node joining a network, whether it is "attaching" to the network for the first time or "re-acquiring" or rejoining the network.

The term "active", when referring to communications channels, may refer to the communications channel (whether frequency channel or DSSS chip set) over which or by which a main or repeater node is presently sending a beacon frame and listening for messages from other repeater nodes or from end nodes.

The terms "main node" and "network coordinator" are used synonymously. The network coordinator is always the main node. Other nodes, such as repeater nodes or even special purpose nodes (not expressly mentioned in this specification) may send beacon frames and be assigned transfer channels, but these other nodes are not coordinators for the network—only lieutenants in their own little corner of the network—and their configuration and function is ultimately defined by the network coordinator.

The main node 101 represents a gateway between a sub-network, comprised of the second and third tiers 104 and 106, and hosts 107. The hosts 107 represent an outside network 108 that interacts with various components, devices and other elements associated with the parent and child nodes 103 and 105 of the wireless sensor network 100 through the gateway main node 101, as shown in FIG. 1. Main node 101 may serve as a protocol bridge between the outside network and the sub-network (i.e., the outside network may be using a wired Ethernet, WiFi, or some other relatively high bandwidth networking protocol, with a conventional transport mechanism such as TCP, while the sub-network may be using an 802.15.4 or similar wireless protocol, perhaps with a transport mechanism like UDP, just as an example).

The main node 101 functions as a gateway for the sub-network (e.g., in tier 2 and tier 3) which is comprised of the repeater nodes and end-nodes (i.e., the multi-tier wireless sensor network). The hosts 107 on the outside network 108 interact with elements of the wireless sensor network through the gateway (main node), as shown in FIG. 1.

Figure 3:
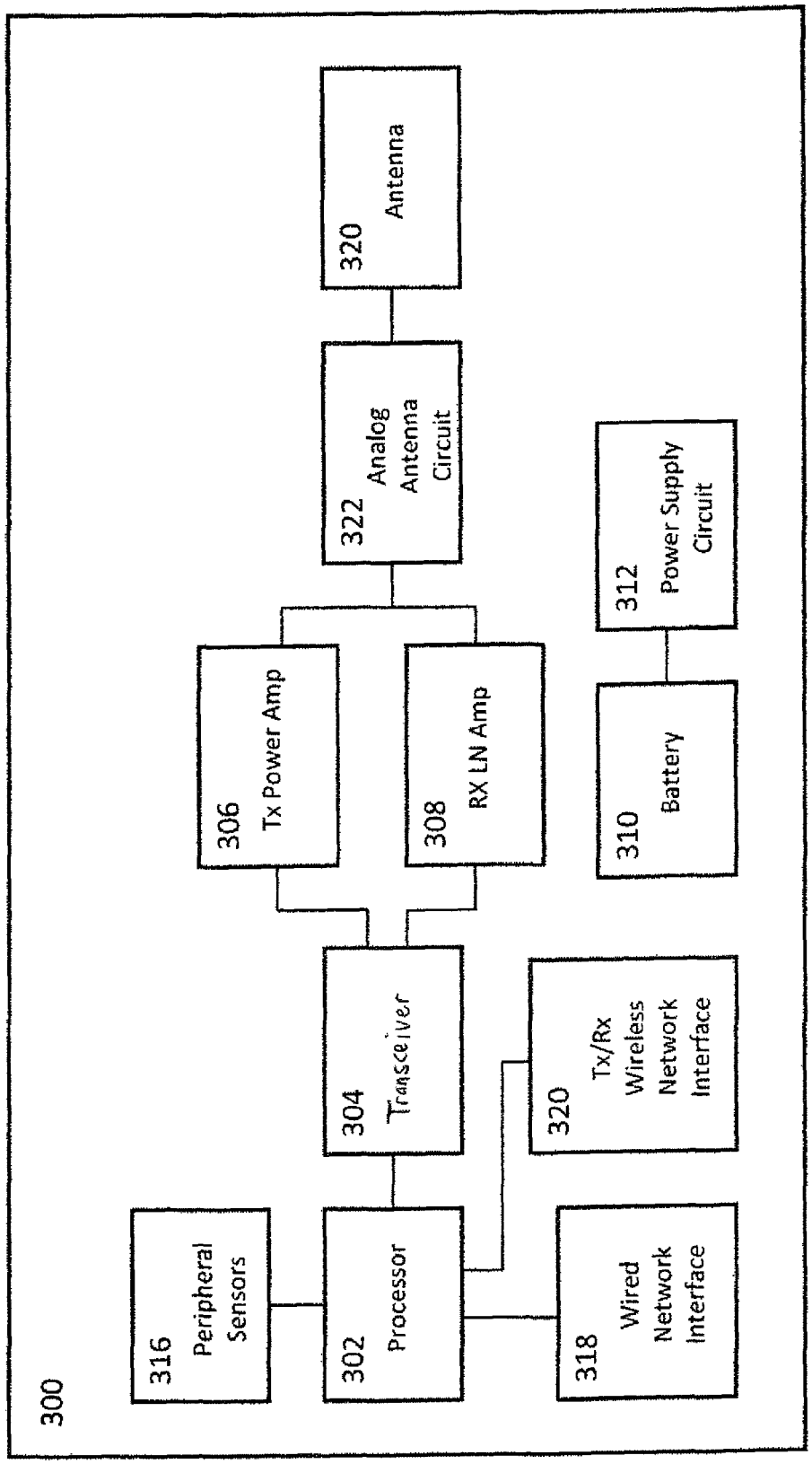
FIG. 3 illustrates a block diagram of a node utilized in accordance with an embodiment.

FIG. 3 illustrates a block diagram of a node 300 utilized in accordance with an embodiment, The node 300 comprises a small circuit board that hosts a transceiver radio 304 and microprocessor 302 (either integrated into one chip, or implemented as two separate chips), a battery 310, and power supply circuit 312. An antenna 320 is coupled to a matching analog circuitry 322. A peripheral sensor or sensing system 316 may be optionally included that send inputs to the microprocessor 302. Sensing systems may include temperature sensors, pressure sensors, motion sensors, 3-axis accelerometers, chemical sensors or arrays of chemical sensors (e.g., "electronic noses"), AM-EAS or RF-EAS or RFID tag detection systems, or even a separate processor defining a virtual event upon occurrence of a collection of real events each of a predefined type, intensity, or exceeding a certain threshold. An example of the latter might be a DSP processor connected to a video surveillance system. These are tendered as examples of sensor systems and it should be understood that this list is in no way exhaustive. Input from the sensor 316 may "wake up" the microprocessor 302 to start a "report" session, such as to convey sensor data detected by the sensor 316 through the transceiver radio 304 over the network 100.

The transceiver 304 may have a memory that stores multiple chip sets for use in the DSSS technique. The chips sets may be stored in the memory in firmware and/or software. To hop to a new channel, the processor 302 may be configured to command the transceiver 304 to switch to a specific channel. The transceiver 304 then retrieves the information about the new channel from its memory, such as the frequency in FHSS or the specific sequence of chips that makes up the selected chip set in DSSS.

Typically, tier 1 and tier 2 nodes are often equipped with power amplifiers 306 (for transmission) and low-noise amplifiers 308 (for reception) to increase the physical range of the wireless links. The main node (tier 1 node) also contains either a wired network interface 318 (such as an Ethernet port and driver chip) or a second radio 320 for a wireless link to another (outside) network (e.g., WiFi interface). The main, repeater and end nodes 101, 103, 105 may have all or part of the structure of the node 300.

Embodiments involve a series-parallel channel hopping protocol (frequency hopping protocol or DSSS chip sequence change protocol), or method that utilizes transfer channels to provide information on channel hopping status (frequency status or DSSS chip sequence status), thus reducing the channel/chip-sequence search scanning time required for an end-node to acquire the network once awakened from a sleep mode. The channel hopping protocol is able to expand simply and uniformly with an ever-increasing number of repeater nodes, since each newly added repeater nodes may command its own transfer channel or channels, and can thus be used with networks containing a total of thousands and even tens of thousands of end-nodes. The "series-parallel" nature of the network arises from the fact that, from a time perspective, each repeater with its subordinate set of children nodes represents a "branch", and communication inside different branches occurs on different channels (different frequency channels or different chip sequences) at any one moment in time, and can thus occur simultaneously (i.e., in parallel). Expansion of a network can also occur by a new repeater node attaching to an existing repeater node, thus creating a new branch attached to an older branch. Messages moving up the new branch may wait for open air before being transmitted into the old branch, and in this case the network has a series-scaling characteristic as new nodes are added. In order to understand how the method might accommodate larger and larger numbers of repeaters, consider the following examples. It should be noted before discussing these examples, that a given channel (frequency channel or chip set channel) might be used as a) a transfer channel by one parent node (main node or repeater node), and b) a regular communications (hopping) channel for all other parent nodes. In accordance with embodiments herein, a CSMA-CA or other "listen before talk" anti-collision algorithm may be employed prior to all transmissions (beacon message, transfer message, and any other type of message).

In a first example (a frequency hopping example), there are ten parent/repeater nodes and one main node. The main node is using channel 49 (the last channel) as its transfer channel. When the first parent/repeater (Re1) first attaches to the network, the main node randomly choses one of the channels as the transfer channel assigned to Re1 for all of Re1 communications with the future children nodes of Re1. Similarly, Re2, Re3, Re10 are assigned transfer channels from the total pool of available channels (0, 1, . . . , 49) according to the main node's own criteria. This criteria may be simply "randomly choose from channels 0, 1, 49 with equal probability for each channel", or it may also include lower or zero probability for less desirable channels (e.g., noisy channels or channels often used by competing networks, as determined by separate energy detection tests on individual channels conducted by the main node). The criteria may also guarantee that no channel was used as a transfer channel for two nodes before each channel had been used for transfer by at least one node (e.g., even distribution of node assignment through the channels).

In a second frequency hopping example there are 49 repeaters. Using the reasoning outlined above, the main node might randomly assign channels such that, after each of the repeaters had attached to the network, each of the 50 available channels served as transfer channel for either the main node or for one (and only one) repeater.

In a third frequency hopping example (a somewhat extreme situation), there are 199 repeaters. In this case each channel might be used as transfer channel for four different repeaters. Each repeater sends a transfer message before each hop, so on average, during the time interval corresponding to one channel dwell (one super-frame time period), each channel will see four transfer frames (from four different repeaters) in addition to normal messaging to and from any of the other repeaters which use that channel as one of its list of frequency hopping channels. Of course, in such a large network, at any given moment most or all of the channels might be in use by the main node and the various repeaters. For example, Repeater 27 might be talking to the main node, Repeaters 8, 56, and 184 might be sending transfer frames on their respective transfer channels, and most of the remaining repeaters may be listening on any one of the 50 channels (whichever they most recently hopped to) for messages from another node. The "series-parallel" scaling of the network refers to the fact that the network is actually using all of the available channels at the same moment, with roughly equal traffic volume, as the network grows in size—both width (number of repeaters in a given network tier) and depth (layers of repeaters or network tiers).

Other examples may use a single frequency channel and a large set of DSSS chip sets to accomplish the same series-parallel network scaling using the DSSS technique. It should also be noted that this series-parallel network scaling can be realized in additional dimensions if frequency hopping and DSSS chip sequence shifting are implemented together. For example, one may have one large series-parallel network with many repeaters in the network, all using frequency hopping and a single constant chip sequence. Meanwhile another equally large network may be using the very same frequency hopping scheme (identical in all respects to the first) but for which the DSSS chip sequence of this second network differed enough from the first to guarantee no message-mixing between the networks.

Figure 2:
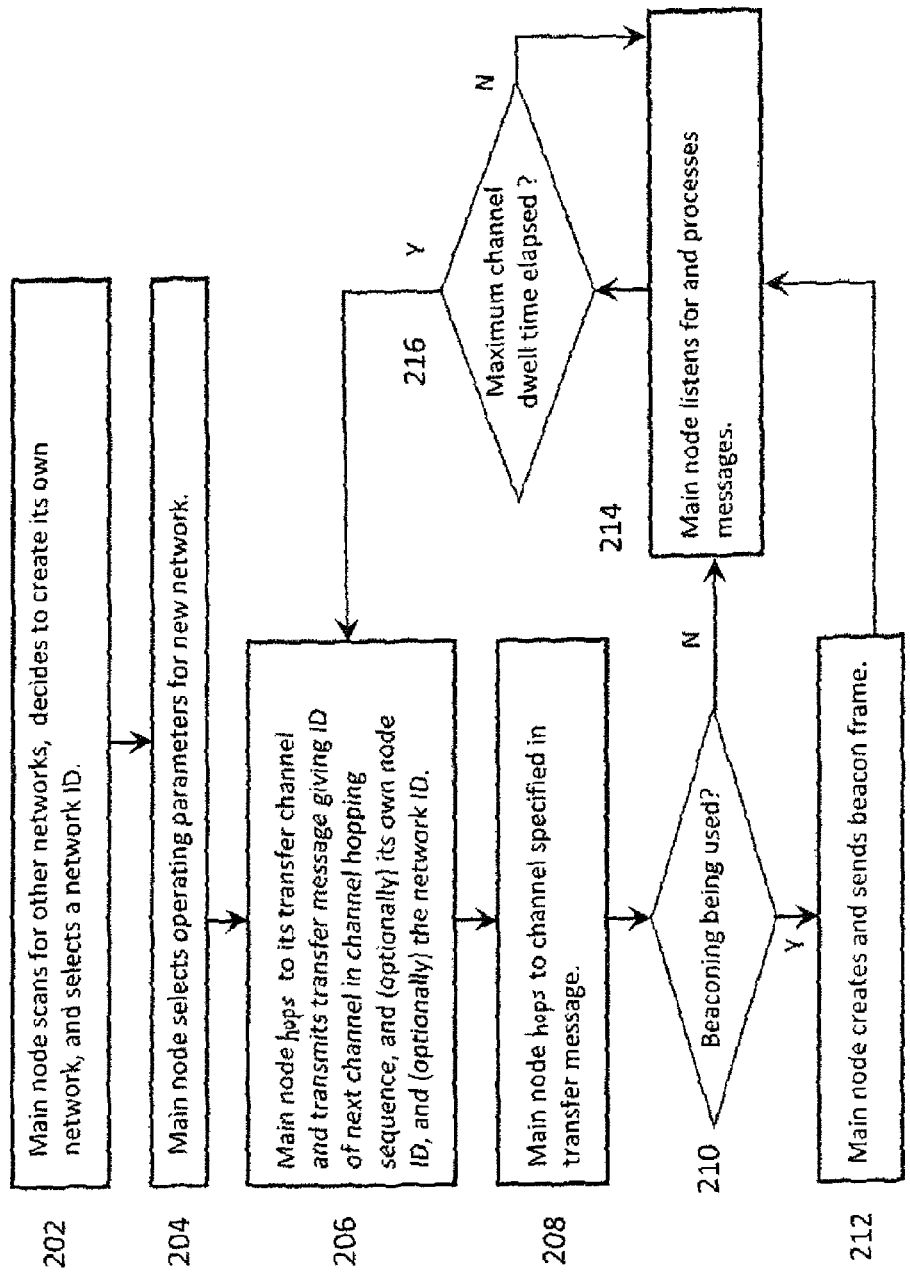
FIG. 2 illustrates a channel hopping method or protocol formed in accordance with an embodiment.

FIG. 2 illustrates a channel hopping method or protocol formed in accordance with an embodiment. The method or protocol illustrated in FIG. 2 may be used in FHSS and/or DSSS techniques. For example, if using a frequency hopping protocol, DSSS may be implemented as well to provide added security and inter-network operability. Initially, a network is created according to a predetermined standard, such as in the manner prescribed in the IEEE 802.11, 802.15.2, 802.15.3, 802.15.4 standards and the like. To create a network, at 202, the main node 101 may scan for existing networks over a set of channels that the main node 101 desires to use. The channels may be frequency channels according to a frequency hopping protocol or chip sets according to a DSSS chip set switching protocol. At 202, after determining that a new network can be created, the main node 101 selects a network ID number. The main node 101 defines a group of communications channels and defines one or more "transfer channels". The main node 101 supports/defines one or more "transfer channels" that represent dedicated channel(s) used only to communicate hopping and security parameters to parent and children nodes 103 and 105 and non-network nodes 107. No other network management messages or data packets are transmitted on the transfer channels by node 101 as the transfer channels are specifically designated solely for transfer information as far as node 101 is concerned.

For example, in a FHSS technique, the network 100 may use 50 channels in a frequency hopping scheme (e.g. channels 0 thru 49), from which a subset of frequency channels, such as two channels (e.g., channels 48 and 49), are used as transfer channels. In another example, the network 100 may use 50 channels in a DSSS chip set switching scheme, where the 50 channels are defined by 50 different chip sets. Each chip set may include, in a binary context, two unique 10-chip sequences, one sequence coding for "1" and the other for "0". During operation, the network 100 may switch between the 50 channels/chip sets, and a subset of chip sets are used as transfer channels. At 204, the main node 101 determines operating parameters.

At 206, the main node switches/hops to a select transfer channel (frequency channel or chip set) and transmits a transfer frame giving a channel ID of a next communications channel in the channel hopping sequence. In a FHSS protocol, the next communications channel may be the next frequency channel over which the main node will communicate. In a DSSS protocol, the next communications channel may be the next DSSS chip set used to communicate messages, and the next communications channel may be mutually orthogonal to the active communications channel while using the same frequency channel. Optionally, the main node may include, in the transfer frame, the main node's ID and the network ID.

At 208, the main node switches/hops to the next communications channel specified in the transfer frame at 206. At 210, the main node determines whether beaconing is being used. If not flow moves to 214. If so, flow moves to 212. At 212, the main node creates and sends a beacon frame over the "next" communications channel (which is now the current active communications channel) designated in the transfer frame at 206.

At 214, the main node listens for and processes messages received over the current active communications channel. At 216, the main node determines whether a maximum channel dwell time has elapsed. If not, flow returns to 214 where the main node continues to listen. If the maximum dwell time has elapsed, flow moves from 216 to 206, and the process is repeated.

At 206-216 the main node begins hopping through a random or pseudo-random list of channels, using the transfer channel to inform any listening nodes regarding the identity of the next communications channel. The behavior of the main node and its children nodes with respect to how time slots are used (which time slots are used at all, and whether they are available for contention or non-contention use, their duration, number, etc.) may be prescribed by the various fields in the beacon frame, as defined in standard protocols such as IEEE 802.15.4. As shown in FIG. 2, the main node does not listen for messages sent to it when tuned to a transfer channel. Transfer channels are one-way communication (from the main node to any listening nodes) to inform the listening nodes about which channel (frequency channel or DSSS chip set) will next be used for two-way communication. The processing of received messages mentioned in step 214 of FIG. 2 may involve any number of request and response messages passed between the main node and the relevant parent or child node, and the processing of that message may even initiate messaging with other (third party) nodes and external network hosts.

It should be noted that embodiments herein afford a great utility by using transfer channels as a solution to the synchronization problem that generally exists between parent and child nodes. For example, without the use of transfer channels, a child node is generally programmed to hop/switch from channel to channel (whether frequency channel or DSSS chip set) in a pre-determined (pseudo-random) order according to a time schedule. The parent and child nodes will be able to communicate with each other if they maintain timing synchronization with respect to these channel hops. This in many implementations has inspired the use of complex PLL (phase-lock-loop) timing approaches which are not practical if the child node must sleep for long periods of time to reduce power. When one or multiple transfer channel(s) are used, the child node need only listen on a transfer channel for a brief period of time (generally not longer than the time period of one or a few channel dwells or "frequency hop intervals" in a FHSS protocol). No timing synchronization is required between the parent and child nodes. In fact, the parent node may from time to time use extra time working in one channel (i.e., be late in hopping/switching to the next channel) with no serious impact on the communications between parent and child nodes. That is, the child just continues to wait and listen on the transfer channel until the information arrives regarding the next communications channel, no matter how long it takes to get that information. Of course, in such a situation it may be desirable to have a time-out timer which would make sure that the child node did not wait for minutes or hours on a bad transfer channel (e.g., in the case of a noisy transfer channel, or if the parent node failed, etc.) and thus prevent battery drain.

Regarding the main node behavior related to FIG. 2, the network may use super-frames that begin with each beacon frame (steps 210 and 212 of the figure). A dedicated network coordinator (e.g., the main node 101) coordinates transmission within super-frames by transmitting the beacon frames at predetermined intervals (e.g., intervals as short as 15 ms or as long as 145 s) (step 216). The super-frames are time slotted. The time between two beacons is divided into equal time slots independent of the duration of the super-frame. Time slots are split into a contention access period (CAP) and a contention free period (CFP). Guaranteed time slots (GTS) are concatenated contention free slots. In the case where no beaconing is used, generally, all of the time period between beacon frames comprise a single large contention time slot (steps 214 and 216) in which any node may compete for messaging privileges using the CSMA-CA or similar protocol-prescribed anti-collision algorithm.

When DSSS is implemented in real networks, a single chip sequence may be selected and used for a period of time which is relatively long (minutes, or even hours) with a single carrier frequency. This frequency can be changed from time to time (for example, when one channel becomes noisy). The chip sequence is often left unchanged for long periods of time. In such cases a single or small set of (known) frequency channels and chip sequences can be used for transfer messaging, and the transfer messages can indicate what frequency channel hopping and chip sequence shifting scheme is currently in use, or is about to be used.

Figure 4:
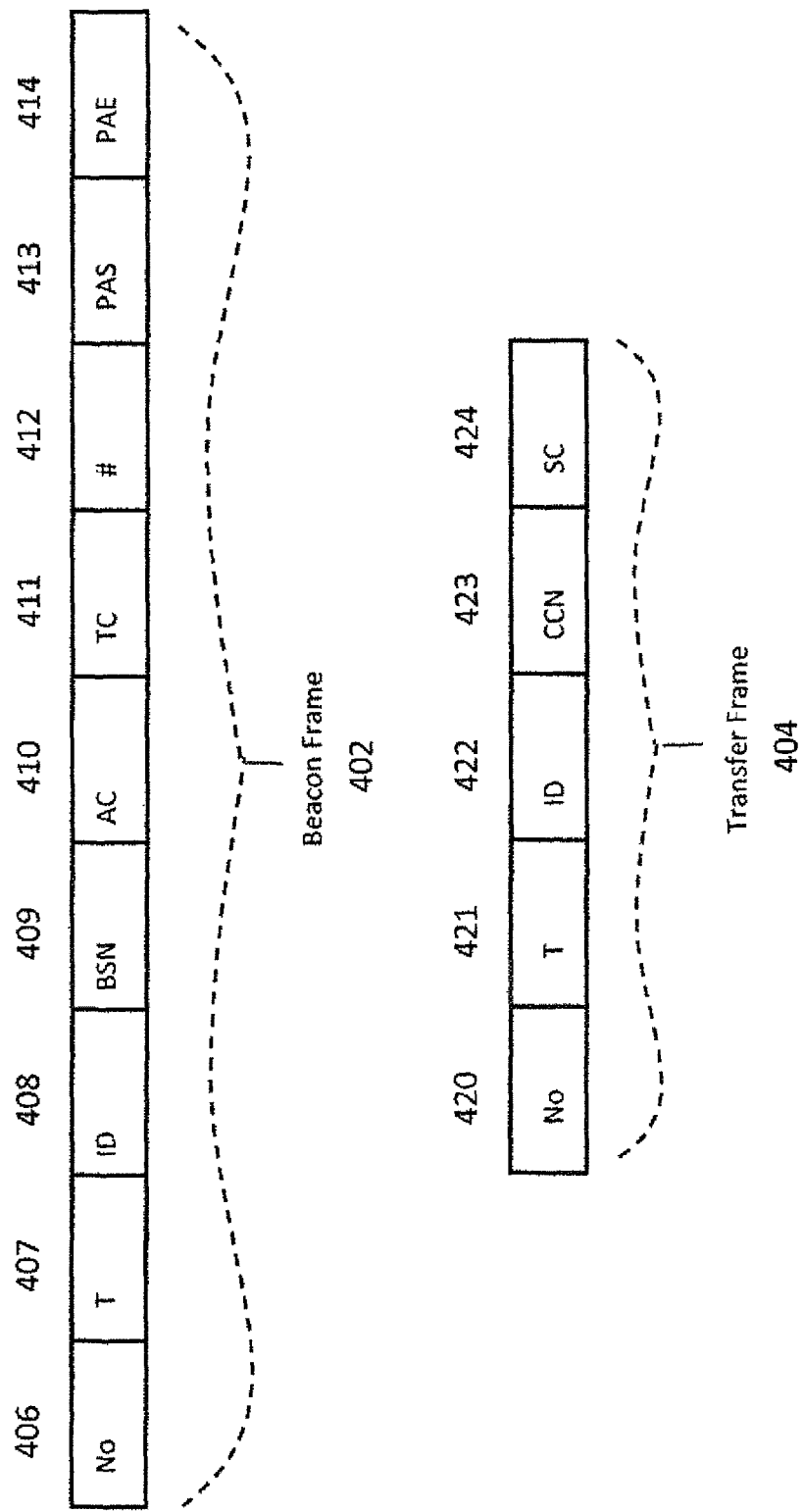
FIG. 4 illustrates the format of the beacon frame transmitted from the main node in accordance with an embodiment.

FIG. 4 illustrates the format of each beacon frame 402 transmitted from the main node 101, for one embodiment. In this embodiment all beacon frames originate from one node—the main node (network coordinator node). The beacon frame 402 contains the following fields. A number of bytes (No) field 406 indicates the number of bytes in the message (e.g., not counting this first byte). A frame type (T) field 407 indicates a number or code indicating that the present message is a beacon frame message. A network ID field 408 includes a unique ID to distinguish the present network from other networks using the same wireless protocol. A beacon sequence number (BSN) field 409 includes a count that increments by one with each successive beacon frame. A new member acceptance code (AC) field 410 includes a code indicating which type(s) of nodes can attach to the network, and under what circumstances.

The beacon frame 402 further includes a "total number of transfer channels" (TC) field 411, a "transfer channel number" (#) field 412 for each transfer channel, a priority access number range—start number (priority access start or PAS) field 413, and a priority access number range—end number (priority access end or PAE) field 414. The TC field 411 indicates how many transfer channels exist. The TC field 411 indicates the number of DSSS chip sets/sequences used for transfer messages (in a DSSS protocol) and/or the number of frequency channels used for transfer messages (in a FHSS protocol). The channel number field 412 indicates which channels within the network represent transfer channels. For example, in a frequency hopping scheme, if there are three frequency channels used for transfer messages, field 412 would include the three numbers identifying the three transfer channels. If, in a DSSS scheme, there were three DSSS transfer channel chip sets, field 412 would include the three numbers identifying those three DSSS chip sequences. A priority access number presents a unique number that is assigned by the main node 101 to each repeater node 103. The PAS field 413 and PAE field 414 represent a range of priority access numbers that are authorized to utilize the active communications channel associated with the present beacon frame. For example, when a beacon frame includes PAS and PAE values of 10 and 20, respectively, this indicates that repeater or end nodes assigned priority access numbers between 10 and 20 are authorized to transmit messages in the time slots of the super-frame following the beacon frame. The repeater or end nodes with priority access numbers below 10 or above 20 would not be authorized to transmit messages following the current beacon frame. This provides the main node with a method of communicating with a large network one piece at a time, thus improving network manageability and reducing latency of high-priority network segments in large networks.

In other embodiments, beacon frames may originate from repeaters (which scenario should not be confused with the scenario in which the repeater merely retransmits or "repeats" the beacon heard from the main node). The simple case where repeaters simply resend the main node's beacon frame can serve to physically extend the network to regions in which end nodes cannot physically hear the main node's messages. However, in the somewhat more complex case where a repeater can create its own beacons, the network scope and scale can be extended not just physically but in other ways. For instance, if in a particular physical area serviced by a particular repeater node there are a large number of end nodes which become unusually active for a short period of time, the repeater may moderate message traffic in that network region by changing PAS and PAE values—that is, narrowing the range of priority access numbers that may participate in any or all of the super-frames governed by its own beacon frames. This extends the power of the network by giving a certain amount of autonomy to repeaters in their region of the network. In this and other embodiments which include beacon frames originating from repeater nodes or any other node separate from the main node, the beacon frame may include a RID (repeater ID) field (not shown in FIG. 4) which identifies the originator of the beacon frame and allows end nodes to distinguish beacon frames originating from their own repeater and beacons from adjacent repeaters.

At any one time an end node will generally have one particular repeater node which it can hear well (i.e., received signal strength of messages from that repeater is greater than that from other repeaters). At that time the end node can be viewed to be attached to the network "through that repeater" with the strong signal. The network operation rules, as governed by the firmware in the nodes individually and collectively, can be set such that the end node may respond through only one repeater at a time, or alternatively through any repeater for which received signal strength is above some threshold value (i.e., end node has multiple points of attachment).

In one embodiment, a child or end node may send a message to any parent or repeater (or to the main node of the network via any repeater) when all of the following criteria are met: (1) a beacon message from the repeater is received (2) the signal strength of the beacon message is above a threshold value (3) the priority access number of the end node is in the range (PAS to PAE) specified by the beacon frame and (4) the message is sent on the channel (frequency channel and/or DSSS chip sequence) specified by the repeater via its particular transfer channel or channels, using the general methods previously described. Several implementation options should be noted here. First, it is possible that the end node will maintain a separate and distinct priority access number for each of several repeaters to which it is currently or has recently connect to the network. Second, in cases where a node sleeps for very long periods of time (perhaps days) and in which the total number of nodes in the network is very large (10's or 100's of thousands), embodiments herein may implement an algorithm in which a node randomly selects its own priority access number in a broad or narrow range (which is perhaps a function of the type of end node), rather than being assigned a priority access number upon joining the network or re-acquiring to the network after a long sleep.

In the simplest embodiment in which all beacon frames originate from the main node, the main node 101 supports/ defines one or more "transfer channels" that represent dedicated channel(s) used only to communicate frequency hopping/DSSS chip set switching and security parameters to repeater and end nodes 103 and 105 and non-network nodes 107. No other network management messages or data packets are transmitted over the transfer channels, as the transfer channels are specifically designated solely for transfer information. For example, the network 100 may use 50 channels in a frequency hopping scheme (e.g., channels 0 thru 49), from which a subset of channels, such as two channels (e.g., channels 48 and 49), are used as transfer channels.

In more complex implementations in which individual repeaters can establish their own transfer channel or channels, those transfer channel(s) will generally be different from the main node's transfer channel(s). Each node (e.g., main, and/or repeater) capable of creating beacon frames may use its own transfer channels to pre-announce the next communication channel for each beacon and subsequent super-frame messaging interval. Also, each of these respective beacon originator nodes may use their own transfer channel or channels only for transfer frames (although other beacon originator nodes may be periodically using the same channel (whether frequency channel or DSSS chip sequence) for normal super-frame message traffic). This scheme is effective, in part, because the nodes may each observe listen-before-talk (CSMA-CA) process rules before each beacon frame message, transfer frame message, or regular message (i.e., a message sent to a particular node).

In certain embodiments, an end node which desires to connect to/acquire the network and send a message (e.g., to the main node, or some external network host via the main node), can do so by first scanning for transfer frames on particular frequency channels and/or using particular DSSS chip sequences. As mentioned above, in certain embodiments, it may be desired that implementers of the network create particular conventions regarding which channels are used for transfer channels. In simple networks where all beacon frames originate from the main node, one or two channels at the beginning or end of the frequency channel or DSSS chip sequence list may be used as the designated transfer channels or sequences.

However, in more complex implementations where many (or even all) channels in the list are being used by at least some of the beacon originators for transfer purposes, and in the general case where the end node is or may be physically moving and thus not associated all the time with the same repeater, upon awakening from sleep, the end node may need to scan through some or all channels (frequency channels and/or DSSS chip sequences), looking for transfer frames with a good/strong signal strength. When the end node finds the best (or at least a good) signal during the scan, it may note the node ID of the originator of the transfer frame. At that point, by virtue of a particular transfer channel assignment convention, the end node may also know, without being told, what other channels are being used by that particular beacon originator as transfer channels. Alternatively, the end node may use one transfer channel with the process previously defined to send a message to the beacon originator requesting specification of the other transfer channels used by the originator. Alternatively, the end node may determine to simply use the one transfer channel and forget any others transfer channels which might be in use by the originator. This latter convention may result in longer waiting periods as the end node sits on the known transfer channel waiting for the transfer frame to arrive while the beacon originator moves through its list of transfer channels, one at a time, sending transfer messages.

Optionally, the beacon frame may be augmented with an additional field indicating the next transfer channel to be used by the sender of that beacon (not shown in FIG. 4). This would not only enable a scanning end node to find all transfer channels for a given beacon originator after having found just one transfer channel, but it would also allow an end node to find a strong repeater signal more quickly than it might otherwise. This is because under the original scheme described above the end node would scan only for transfer channels (such as frequency transfer channels and/or DSSS chip sequence transfer channels). In this optional case, the end node can scan for either a transfer frame within multiple transfer channels or a beacon frame. Once the end node finds either a transfer frame in one of the transfer channels or a beacon frame, it can track the frequency or DSSS chip sequence hopping of the originator node. Transfer frames indicate the channel of the next beacon frame, and each beacon frame indicates the channel of the next transfer frame.

During network operation, at 206-216 in FIG. 2, the nodes 101, 103, 105 communicate over one frequency channel and/or using one DSSS chip set/sequence for a short period of time, referred to as "channel dwell time". For example, the channel dwell time may be up to 0.2 seconds or slightly longer, and thus it may take about 9.8 seconds for the network 100 to cycle through communication over a set of 48 communications channels (0 thru 47), which corresponds to frequency channels and/or DSSS chip set channels. After the channel dwell time has elapsed, communications move (also referred to as hopping or switching) to another channel (i.e., the next communications channel). Just prior to each channel hop, the main (gateway) node 101 sends out a short message, at 208, called a "transfer message", on one of the transfer channels (e.g., channel 48 if the last transfer message went out on channel 49, and vice versa), which identifies the channel designated as the next communications channel. Therefore, the nodes 103, 105 that are acquired to the network locate the transfer channel (e.g., channel 48) in order to receive the transfer message, so the nodes 103, 105 may hop to the next designated communications channel to keep communicating over the network.

FIG. 4 illustrates a format for a transfer frame 404 transmitted by the main node 101, in accordance with an embodiment. The transfer frame 404 contains transfer message information, so the terms "transfer frame" and "transfer message" are used interchangeably herein. The transfer message 404 includes a number of bytes (No) field 420 to indicate the number of bytes in the transfer message 404 (not counting this first byte). A frame type (T) field 421 includes a number or code indicating that the present message is a transfer frame message. A network ID number (ID) field 422 includes the network ID to distinguish the message from messages intended for other networks using the same wireless protocol. A communications channel number (CCN) field 423 indicates the number of the next communications channel to become active and which nodes should move/hop to remain acquired to the network.

A transfer/security code (SC) field 424 includes a number between 0 and 255 which indicates which frequency channel or DSSS chip set hopping sequence is being used, what security keys are being used at the moment, and so on. Optionally, the transfer frame 404 may also, in certain embodiments, include a field identifying the node ID of the originator of the transfer frame. This field is not shown in FIG. 4.

Returning to FIG. 1, and assuming for the present example the simple embodiment in which all beacon frames originate from the main node, when a repeater or end node 103, 105 wakes up and wishes to attach to or re-acquire the network 100, the non-acquired node 103, 105 randomly chooses one transfer channel, switches to the chosen transfer channel, and begins listening for the next transfer message 404 that will be sent from the main node 101. Given that the main node 101 transmits transfer messages alternately over each of the transfer channels, the non-acquired node 103, 105 will hear one of the next two transfer messages (assuming there are two designated transfer channels). For example, for a non-acquired node 103, 105 listening to a transfer channel during channel hop (CH) time (T), the non-attached node 103, 105 will hear a transfer message at CH time T+1. The transfer message 404 informs acquired and non-acquired repeater and end nodes 103, 105, of the next communications channel the network 100 will hop (switch) to during the next channel hopping time interval, in order to continue sending and receiving messages (remain acquired) over the network 100.

Referring back to FIG. 2, at 206, after the new (recently awoken) non-acquired repeater or end node 103, 105 receives and processes the transfer message 404, the repeater or end node 103, 105 jumps to the specified upcoming active communications channel and waits for a beacon frame 402 to be transmitted by the main node 101 over the newly designated communications channel. At 212, the main node begins sending a beacon frame 402 over the designated communications channel (as indicated in the transfer message 404) at a predetermined interval. After each beacon frame 402 is transmitted, next at 214, the non-acquired repeater or end node 103, 105 can acquire the network by receiving and transmitting data and messages in available time slots between the beacon frames 402.

All communication between the beacon originator and the beacon user nodes occurs in step 214, while checking/waiting for the end of that message exchange time period (step 216). It should be noted that the transfer message approach affords a variable amount of time to send messages. If the originator node needs a little extra time to finish up with the messaging for a given end node, it can take that time and just be a little late with the next transfer frame on the next transfer channel. The system won't "break" if this occurs and extra time is taken, because waiting nodes just wait a little longer.

As one example, the network may use a media access control scheme similar to that used in 802.15.4 networks with super-frames that begin with each beacon frame. A dedicated network coordinator (main node 101) manages transmission within super-frames by transmitting the beacon frames at predetermined intervals (e.g., Intervals as short as 15 ms or as long as 245 s). The super-frames may be time slotted, and a node may use CSMA-CA before transmitting at any time unless that node is currently inside a guaranteed time slot which it owns exclusively. The time between two beacons is divided into equal time slots independent of the duration of the super-frame. Time slots are split into contention access period (CAP) and a contention free period (CFP). Guaranteed time slots (GTS) are concatenated contention free slots owned exclusively by a particular node. In the above example, the transfer message transmitted at 206 identifies the communications channel associated with the next super-frame. The non-acquired end node switches and listens to the communications channel identified in the transfer message and transmits messages over appropriate time slots in the super-frame following the beacon frame.

In one embodiment, two transfer channels are utilized. Two transfer channels may be desirable in a FHSS scheme given that the FCC Part 15-29A rules provides that when frequency hopping, the network should not favor one channel more than another. Since the main node 101 uses one of the transfer channels between each channel hop, the main node 101 uses each of the transfer channels for a relatively short period of time, thereby making the total dwell time for all 50 channels average out to about the same value. In more general and complex embodiments in which multiple nodes may originate beacon frames and each such originator node is assigned or assumes, based on some appropriate algorithm, a set of channels to be used as its transfer channels, it should be noted that the number of channels used for transfer for each originator node can be chosen such that regulatory requirements are met.

In certain network configurations one transfer channel may not afford sufficient dwell time in a frequency hopping scheme. For example, over a 9.8 second period, the first 49 channels would each be used for 0.2 seconds. During that 9.8 second period, when a single transfer channel exists, the transfer channel would be used 49 times, and thus the channel dwell time for the transfer message may not be more than $0.2/49=0.004$ seconds or just 4 milliseconds. At a data rate of 9.6 kbps (that is, 9600 bits per second), the main node 101 can send slightly less than 5 bytes during the 4 millisecond channel dwell limit, so if a single transfer channel were used, the single transfer channel would not provide enough time to permit transfer of the entire transfer message (6 bytes long). However, when the network uses two transfer channels rather than one, the network will use each of the two transfer channels, on average, 24.5 times in the 9.8 seconds, so the allowed dwell time in the transfer channel is $0.2/24.8=8$ milliseconds, which is sufficient time to send 6 bytes at 1.2 bytes per millisecond.

However, if the foregoing constraints do not exist, then a single transfer channel may be used, or optionally more than two transfer channels may be used. Also, this frequency hopping scheme may be replaced by or augmented by a DSSS chip sequence switching scheme, as described above, in which certain DSSS chip sequences are dedicated to transfer frames.

Note that the above calculations for regulatory compliance in frequency hopping situations may change if the number of communications channels changes. For example, 25 communications channels may be used in frequency hopping rather than 50 channels (which is in fact the case under certain circumstances for FCC Part 15-29A). When 25 communications channels are used, then a single transfer channel may be sufficient.

In the above example, the transfer channels may be set at the time the network is created (at 202). However, the transfer channels may experience undue noise at times. For example, it is not certain that the last two channels in a set of channels will always be free of excessive environmental (EM) noise. Instead, the main node 101 may determine whether certain channels are experiencing undue noise, such as by monitoring the signal quality, When a transfer channel experiences undue noise, the main node 101 identifies the noise and determines that the transfer channel should be changed, in order to make the protocol more robust and more generally applicable. Hence, the beacon frame 402 sent by the main node 101 at the beginning of each channel hop will include information regarding how many communications/transfer channels are used and which channels are being used for the channel transfer(s). It should also be noted that in cases where not all beacon frames originate from the main node, the main node may give permission to the new originator node before that originator node can begin sending beacon frames. Also, the originator nodes may receive from the main node, as part of an originator node commissioning or re-commissioning and on-going management process, specific channel assignments for transfer channel use. Alternatively, the main node may specify, as part of this commissioning and management process, a particular algorithm or criteria set chosen from a set of algorithm or criteria set options, which algorithm or criteria may be used by the new originator node itself to select its own transfer channel or channels.

Optionally, in order to comply with regulatory requirements or security requirements, a particular implementation may specify an algorithm or external key or indicator, accessible by all acquired and non-acquired nodes, which can be used in an algorithm or "hash" calculation with other ID fields and parameters to determine the transfer channel or channels (including frequency transfer channels and/or DSSS transfer chip sequences) for a particular originator node, and that the transfer channel or channels may change for the given originator node from time to time, as governed by the algorithm or hash and its input parameters. For example, a network time stamp (in conjunction with low-power RC-type clocks available in sleeping nodes) along with a network ID and network-hardware-specific security key may be used by a newly awoken end node to anticipate the transfer channel or channels of a given originator node, especially in cases where the newly awoken end node has some history with a particular originator node (e.g., knew at one point in time what transfer channel set was being used by that originator node). This allowance for varying transfer channel assignments makes general use of channels appear more random to devices outside the network, improves security, and makes regulatory compliance more feasible.

When an end-node or repeater node 103, 105 wakes up or boots up for the first time, the new (non-acquired) repeater or end node 103, 105 can do a complete network search through all channels, including frequency channels and/or DSSS chip sets (complete network scan). However, by virtue of the information in beacon frames, the new repeater or end node 103, 105 need not scan all channels, but instead is able to determine how to join a given network based on the information in the transfer message 404 and the beacon frame 402. Once the newly booted, but non-acquired repeater or end node 103, 105 knows the transfer channels, the new repeater or end node 103, 105 no longer needs to do full network scans, and can quickly use the transfer channel to learn which communications channel is the proper channel without wasting energy on long channel searches.

Figure 5:
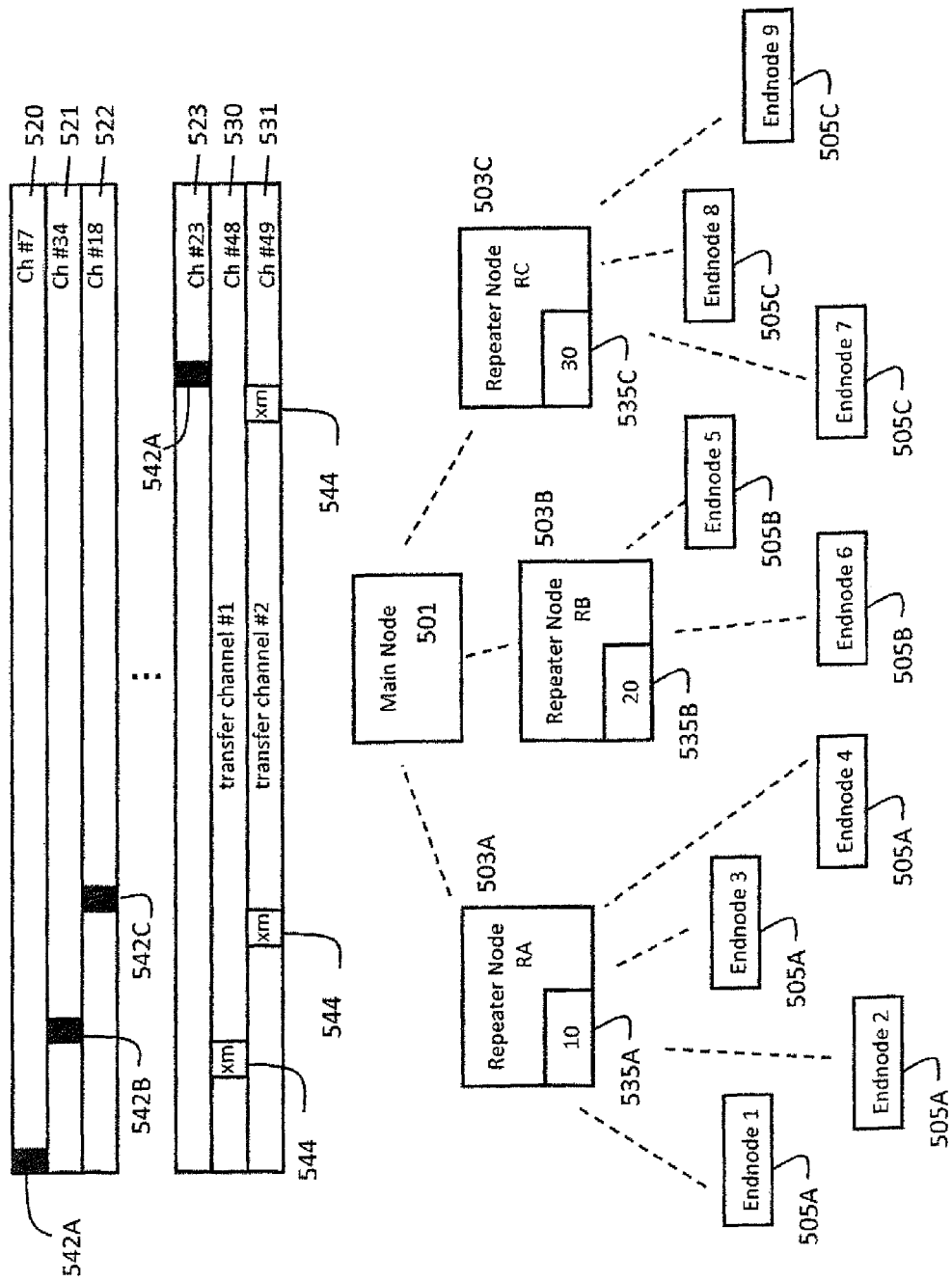
FIG. 5 illustrates an exemplary process for managing attachment of nodes in accordance with an embodiment.

FIG. 5 illustrates an exemplary process for managing attachment of nodes that). may apply analogously to frequency channel hopping schemes and DSSS chip set-defined channel switching schemes. In this case, for example, only the main node is allowed to send beacon frames. The main node 501 creates a network with communications channels (CC) 520-523 and transfer channels (TC) 530, 531. There may be a number of communications channels, such as often up to 50 in number, accessed in (pseudo)random order, but only the first three and last one (channel numbers 7, 34, 18, and finally 23) labeled as 520, 521, 522, and 523 are shown in the figure. The rows at the top of FIG. 5 depict timelines for each channel, with time increasing from left to right. If the figure were expanded to show all 50 of the channels, each would show its own beacon frame marker with a unique time position, and uniform time spacing between sequential beacon frames. Note that immediately prior to each beacon frame transmission on one of the regular communications channels (520-523), a transfer frame 544 is sent on one of the two transfer channels (530, 531).

As previously described, each transfer frame 544 gives the channel number of the next communications channel. The network includes main, repeater, and end nodes 501, 503, 505, respectively. The beacon frames 542 also give values for priority access number range (PA number range) start and end numbers (PAS and PAE). The PA number ranges are useful for the following reason. When a node 503, 505 (either a repeater node or an end-node) attaches to the network, one of the numbers assigned to the repeater or end node 503, 505 is the ID number (network address) of "parent node". If the end node 505 attaches to the network via a nearby repeater node 503, the parent node will generally be that repeater node 503. Sometimes an end-node 505 will attach directly to the main node 501 when joining the network. Regardless, at the time the end node 505 joins the network, the new node 505 will receive, along with the node ID of the parent node, a PA number. In one embodiment, the PA number for an end node might be the same as the parent node's PA number. As each repeater node 503 joins the network by attaching to the main node 501, the main node 501 gives each of the repeater nodes 503 a different PA number. Then, when end nodes 505 begin to attach to the network via nearby repeater nodes 503, each end node 505 inherits the PA number of its parent node.

As an example, in FIG. 5, three repeater nodes 503 (nodes RA, RB, and RC) may join a network newly created by a main node 501. As the three repeater nodes 503 join, the main node 501 assigns each a PA number 535A-535C (say, 10, 20, and 30, respectively). Then assume that nine end nodes 505 boot up and join the network. The first four (1-4) of these new end nodes 505 join via repeater node RA, and therefore receive a PA number of 10. The next two (5-6) nodes 505 join using repeater node RB, and receive PA number 20. The final three (7-9) end nodes 505 join the network using the last repeater RC, and thus receive a PA number of 30. Each PA number plays the role of a sub-network identifier, and each repeater node 503 represents the head (gateway) to a corresponding sub-network. These repeaters 503 are not true coordinator nodes since each may only (in this embodiment) repeat the beacon frame from the main node if and when it arrives (details of this repeat and are omitted from FIG. 5 for simplicity). However, in the more complex embodiments described above, each beacon can be given the right to generate its own beacon frames over communications channels according to its own (pseudo)random frequency channel hopping or DSSS chip set switching sequence, utilizing its own set of transfer channels to pre-announce each frequency hop, as described above. The ideas shown in FIG. 5 for the simple case can be extended by analogy to more complex cases.

One use of the PA numbers is as follows. When the main node 501 sends out a beacon frame 542, the beacon frame 542 includes start and end values (PAE and PAE) for a range of PA numbers. During the interval associated with the beacon frame 542 (time period until the end of the 0.2 second-long channel dwell time), only those repeater nodes 503A-503C with PA numbers inside the transmitted range have permission to repeat the beacon frame and thus enable the transmission of end nodes 505 inside their respective sub-network. For example, during one beacon frame 542A, the main node 501 will include the PA number range 535A associated with RA repeater node 503A. Only the RA repeater node 503A repeats this beacon frame 542A, and only end nodes 505A transmit messages over channel 520 following the beacon frame 542A. During the next beacon frame 542B, the PA number range 535B is included, and thus repeater and end nodes 503B and 505B respond accordingly. The above use of PA numbers is useful in situations where the network becomes very large, and it is not practical to allow all nodes to have access to the same beacon frame at any one time. Also, another utility for the PA number is to allow the main node to manage the network with respect to preventing message overlap when not all of the nodes in the network can hear all messages from all other nodes.

For example, when a large and physically distributed network with four repeater nodes (north, south, east, and west), and a main node in the center is used, and all of the north repeater's end nodes can hear each other, and their repeater. Similarly, all of the south repeater's end nodes can hear each other, and also their repeater. And so on with east and west repeaters. In situations where each sub-network contains a large number of nodes and/or there are a large number of network events (large number of messages in a period of time), there will be an increased chance that two end nodes from two different sub-networks which cannot hear each other will both try to send messages at the same time. To avoid this potential message conflict, the main node can restrict which of the two sub-networks is active at any one time by using PA number ranges in each beacon frame.

Optionally, the method may assign each repeater (each sub-network) its own network-specific channel hopping/switching order. All repeaters still communicate with the main node on the same set of channels, with the same transfer channel scheme (whether the transfer channel scheme uses FHSS or DSSS techniques). However, when an active repeater turns around to talk to its end nodes, the active repeater can do this on a different set of transfer channels and use a different order for hopping among the regular communications channels. This becomes very useful when the number of nodes in the network becomes exceedingly large. For example, in one situation there may be 30 repeaters (and 30 respective sub-networks), with a total of several thousand end nodes in the collective set of sub-networks, and the main node may assign PA numbers to each repeater such that, at any given moment, only 5-10 of the 30 sub-networks are active, and no two of those active sub-networks are using the same frequency channel or DSSS chip sequence hopping order at the same time. This creates a "series-parallel" arrangement in which, at the beginning of each 0.2 second channel dwell, all repeaters jump to the same channel (frequency channel or DSSS chip set) to communicate (Rx and Tx) with the main node (the "series" part of the cycle). Then when each repeater is finished with its business with the main node, it jumps to its own sub-network to talk to its own end nodes using its own channel order and transfer channel assignments. Because the respective sets of frequency channels or DSSS chip sequences are mutually orthogonal among the sub-networks, this sub-network communication can all happen at one time (the "parallel" part of the cycle).

Figure 6:
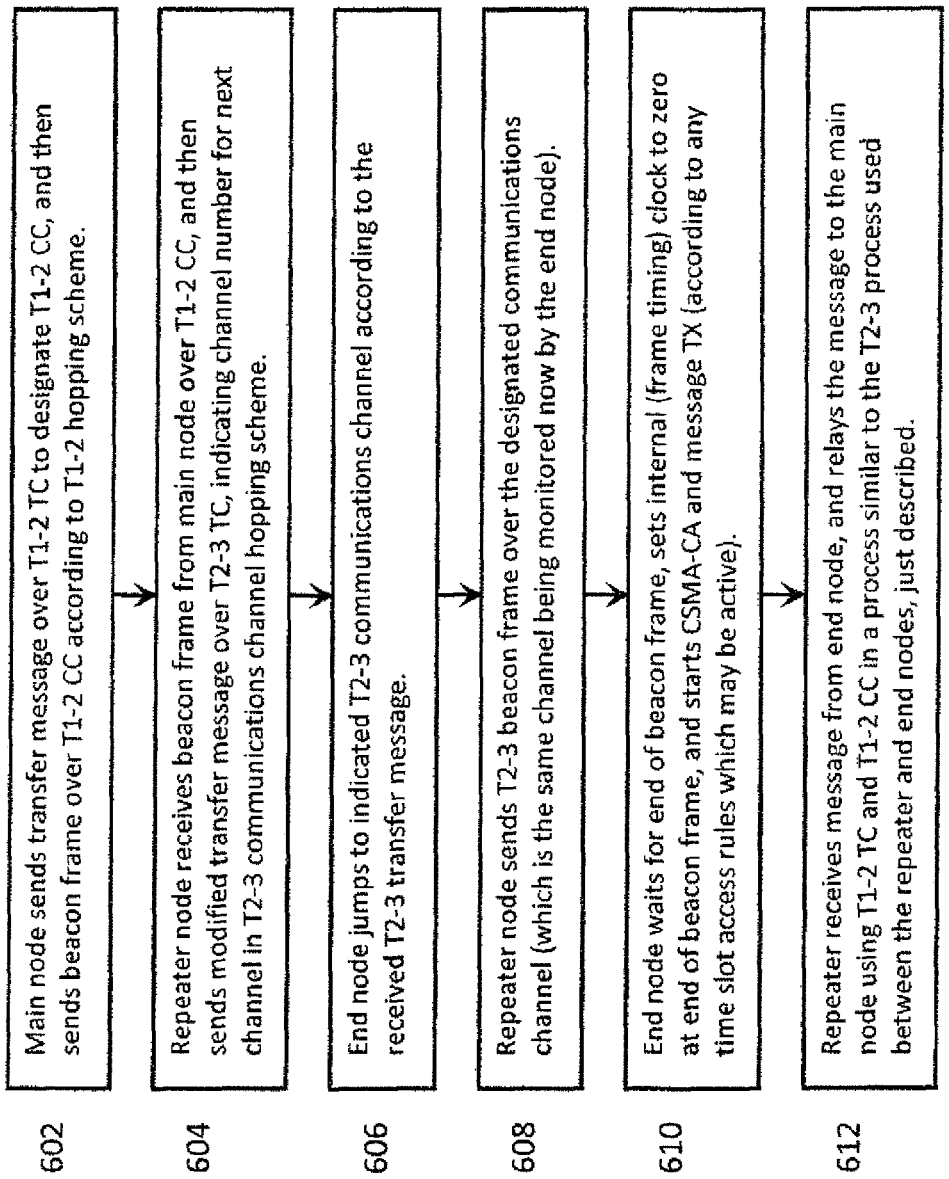
FIG. 6 illustrates a method implemented in accordance with an alternative embodiment for managing network communications.

FIG. 6 illustrates a method implemented in accordance with an alternative embodiment for managing network communications. The method may be used in accordance with FHSS and/or DSSS channel hopping schemes. Beginning at 602, the main node sends a transfer message over a transfer channel associated with communications between tier 1 and tier 2 nodes (hereafter referred to as the T1-2 transfer channel or T1-2 TC). The transfer message designates a communications channel over which the main node intends to send a subsequent beacon frame. The hopping scheme followed by the main node corresponds to a tier 1-tier 2 communications channel hopping scheme and transfer channel management scheme. As explained hereafter, the main node communicates with repeater nodes in the second tier over one or more transfer channels that are separate and distinct from transfer channels over which repeater nodes subsequently communicate with end nodes.

Hence, in accordance with the embodiment of FIG. 6, at least one tier 1-tier 2 (T1-2) transfer channel is uniquely associated with communications between the main and repeater nodes. A separate and distinct tier 2-tier 3 (T2-3) transfer channel is designated for and maintained between repeater and end nodes. Optionally, multiple separate and distinct transfer channels may be utilized with different repeater nodes. For example, one repeater node or a set of repeater nodes may use one transfer channel, while another repeater node or another set of repeater nodes utilize a separate and distinct transfer channel.

Optionally, the communications channels utilized by the main, repeater, and end nodes may be the same channels, but used in non-interfering different hopping schemes. For example, the main node may initiate a hopping scheme between the communications channels but follows a first hopping order (T1-2 hopping scheme), while the repeater nodes follow a different hopping order (referred to as a T2-3 hopping scheme). The repeater nodes manage the tier 2-3 hopping scheme to avoid interfering with or simultaneously utilizing a communications channel used in the T1-2 hopping scheme. It should be noted that generally, where a relatively large number of repeater nodes are operating and using their own hopping sequences, these hopping sequences, whether frequency channel or DSSS chip set, would normally be mutually orthogonal, or nearly mutually orthogonal. That is, the hopping sequences, taken as a set, would not include at any one time more than one node using any given channel as its current active channel.

Once the main node at 602 sends a transfer message over the T1-2 TC, the main node next sends a beacon frame over the T1-2 communications channel (T1-2 CC) according to the T1-2 hopping scheme.

At 604, the repeater mode, after receiving the transfer message from the main node, sends a modified transfer message over the T2-3 transfer channel to designate a current T2-3 communications channel associated with the T2-3 hopping scheme. The transfer message conveyed by the repeater node is modified from the transfer message conveyed by the main node to avoid designating the same active communications channel for the end nodes as currently being used by the main node. For example, when the main node sends a beacon frame at 602 designating channel 5 as the T1-2 active communications channel, the repeater node may send a modified transfer message over the T2-3 transfer channel designating channel 10 as the T2-3 active communications channel, thus incrementing the current communications channel for use within nodes to be a pre-determined number of channels greater than or less than the channel designated by the main node.

At 606, the end node jumps to the designated T2-3 communications channel in accordance with the modified transfer message and according to the T2-3 hopping scheme.

At 608, the repeater node sends a T2-3 beacon frame over the designated T2-3 communications channel. At 610, the end node acquires the designated T2-3 communications channel: after receiving the beacon frame from the repeater node. The end node then transmits any messages to the repeater node in accordance with current operations to be performed or reported by the corresponding end node. The repeater node receives one or more messages from one or more end nodes following the beacon frame transmitted at 608 in accordance with the time slots following the corresponding beacon frame. Once the repeater node has received any messages from associated end nodes during the time slots following the beacon frame, the repeater node then relays this information to the main node at 612.

At 612, the repeater node relays any end node messages from one or more of the end nodes attached to the repeater node to the main node. The messages are relayed to the main node over the T1-2 communications channel designated at 602.

The process of FIG. 6 iteratively operates such that as the main node conveys each new transfer message and each new beacon frame, the repeater nodes modify the transfer message to designate an active communications channel not presently being used by the main node. By utilizing different communications channels and separate transfer channels, the method of FIG. 6 forms the series-parallel communications arrangement referred to above.

Figure 7:
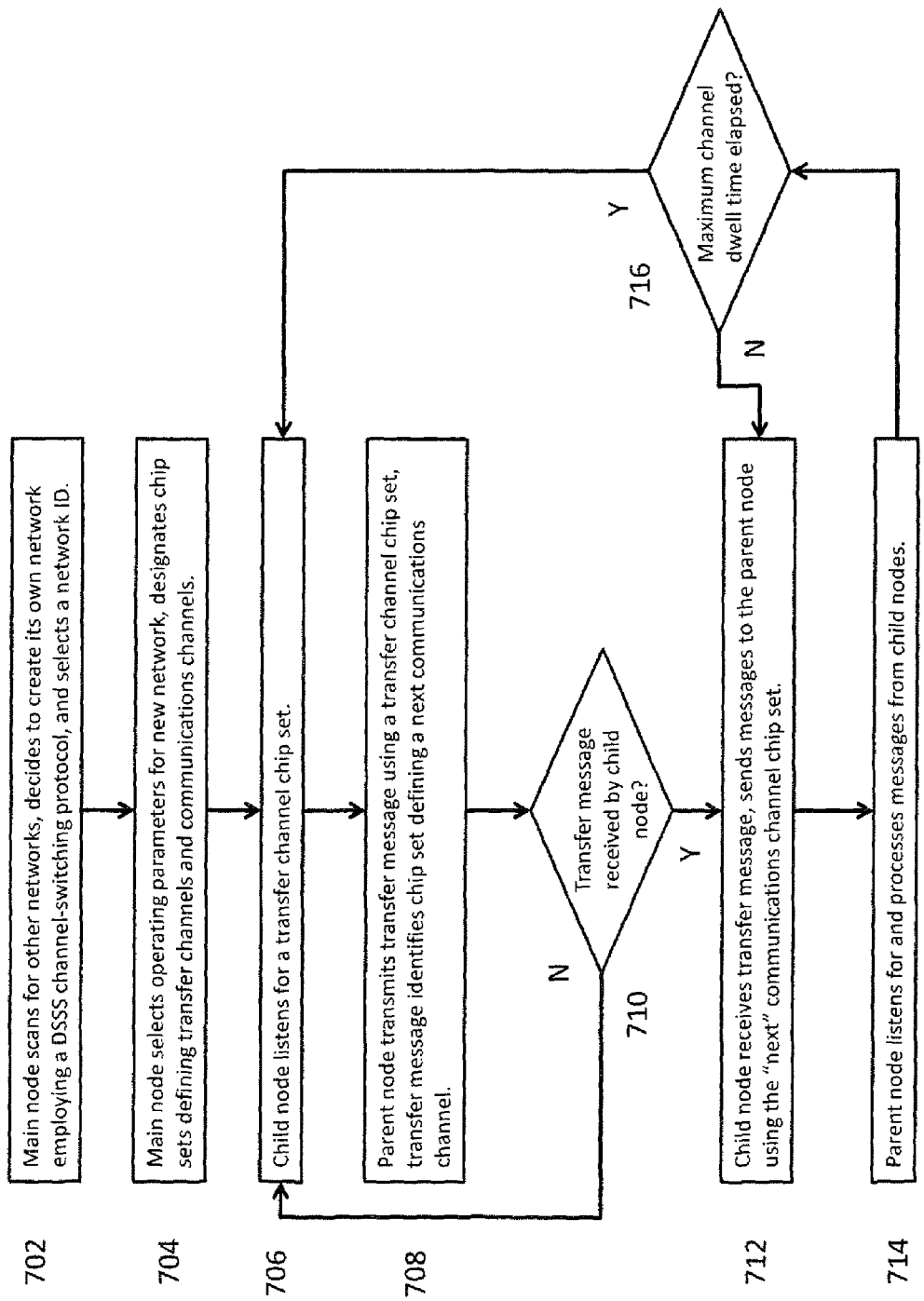
FIG. 7 illustrates a DSSS chip sequence switching method or protocol formed in accordance with an embodiment.

Optionally, when assigning the PA range (start and end PA numbers), the main node can take into account the physical distance between any two repeaters, and thus minimize the impact of two end nodes in two different sub-networks jamming each other's messages if, by chance, they try to use the same channel (frequency channel or DSSS chip set). That is, the PA number range is chosen such that only one repeater in a given physical area is active at one time. FIG. 7 illustrates a DSSS chip sequence switching method or protocol formed in accordance with an embodiment. The method or protocol is specific to the DSSS chip set/sequence switching scheme, but is adaptable for the FHSS frequency hopping scheme. To create a network, at 702, the main node 101 (shown in FIG. 1) may scan for existing networks over a set of channels that the main node 101 desires to use, where the channels are defined by DSSS chip sets. Alternatively, the network may be created in accordance with any conventional technique for establishing a DSSS-based network. After determining that a new network can be created, the main node 101 selects a network ID number.

At 704, the main node 101 selects operating parameters for the new network. The main node 101 also defines a group of communications channel chip sets and at least one transfer channel chip set used in the network only to communicate hopping and security parameters to other nodes (e.g., repeater nodes 103, end nodes 105, and/or non-network nodes 107, shown in FIG. 1).

A child node listens for a transfer channel chip set at 706. The child node may be (i) a non-attached node attempting to join the network for the first time, (ii) an attached node attempting to rejoin or re-acquire the network after waking from sleep, or (iii) a node currently acquired to the network. The child may be an end node 105 or a repeater node 103, as both are children to the main node 101. The child node may know the transfer channel chip set because the node is pre-programmed with the transfer channel chip set, the transfer channel chip set is a standard or predictable chip set, or the child node may be configured to scan a group of available chip sets listening for a transfer message.

At 708, a parent node transmits a transfer message using a transfer channel chip set. The parent node may be the main node 101 and repeater nodes 103, as the main node 101 may transmit a transfer message to the repeater nodes 103 and the repeater nodes 103 may retransmit the transfer message (or a modified transfer message as in FIG. 6) to the end nodes 105. To devices that do not know the transfer channel chip set, the transfer message sounds like pseudo-noise, and is undecipherable. The transfer message, to receivers that know the transfer channel chip set, identifies the chip set that defines a next communications channel as directed by the main node 101.

Since there may be multiple designated transfer channel chip sets in the network, the child node at 706 may be listening for a transfer channel chip set that was not used by the parent node in 708 to transmit that particular transfer message. Therefore, at 710, the child node determines whether it has received a transfer message yet by listening for the transfer channel chip set. If the transfer message was sent by the parent node using a different transfer channel chip set (e.g., channel chip set 48) than the chip set the child node is listening for (e.g., channel chip set 49), the child would not have received the transfer message, so flow returns to 706 where the child node continues to listen for the same transfer channel chip set. The transfer channel chip set listened to by the child node may be the next chip set used by the parent node to transmit a transfer message. If the child node was listening for the same transfer channel chip set that the parent node used to transmit the transfer message, flow moves to 712 because the child node received the transfer message.

Once the child node receives the transfer message, the communications channel number field 423 (shown in. FIG. 4) in the transfer frame 404 informs the child node of the chip set that will be used to define the next communications channel. After an amount of time designated by the main node 101 in the network parameters, the child node at 712 may switch to the "next" communications channel chip set (now the current/active communications channel chip set) to transmit messages to the main node 101 and/or other nodes in the network. If the child node was previously non-acquired, the child node acquires the network by communicating using the "next"/active communications channel chip set. At 714, the parent node listens for and processes messages from child nodes sent using the active communications channel chip set.

At 716, the main node 101 and/or repeater nodes 103 determine whether a maximum channel dwell time on the active communications channel has elapsed. If not, flow returns to 712-714 where the child node continues to communicate with the parent node(s) using the "next"/active communications channel chip set. If the maximum dwell time has elapsed, flow moves from 716 to 706, and the process is repeated. Returning to 706, the currently-acquired child node now listens for a transfer channel chip set containing a new transfer message that will identify a new next communications channel chip set, as the main node 101 continues to switch designated communication channels. For example, if there are two designated transfer channel chip sets (e.g., 48 and 49), the main node 101 may alternate between transfer channel chip sets. Therefore, if the previous transfer channel chip set was 48, currently-acquired nodes in the network at 706 may be configured to listen for chip set 49 to stay acquired to the network.

Optionally, the main node 101 (or repeater nodes 103) may send beacon messages using the "next"/active communications channel chip set. The beacon messages may coordinate parameters such as chip set time slot timing and identification of transfer channels.

In an alternative embodiment, the beacon message may contain a communications channel number field (similar or identical to the CCN 423 of transfer frame 404) that identifies the next communications channel chip set in the DSSS channel hopping scheme. In this embodiment, acquired nodes may not need to listen to transfer channel chip sets after acquiring the network. Therefore, after the maximum dwell time has elapsed at 716, flow for acquired nodes may skip stages 706-710 and return directly to 712 as the nodes switch directly from the previously active communications channel chip set to the "next"/active communications channel chip set identified by the beacon message using the previously active communications channel chip set.

Embodiments described herein may be utilized in various fields such as in retail stores in which a large number of wireless sensor nodes are used on, collectively, retail items for sale, the persons (bodies) of store personnel, tools, assets, fixed sensing locations (such as shelf edges, portals, point-of-sale queues), and so on.

At least one embodiment uses a DSSS chip set selection scheme, in addition to or alternatively to a FHSS scheme, to provide the technical effect of providing the same benefits of uniform series-parallel expansion of network capacity as the number of repeaters expands.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the codes and protocols described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A method for providing a wireless sensor network between a main node and a plurality of nodes, the nodes associated with sensors, the method comprising:
    defining communications channels over which the main node communicates with the nodes based on a channel hopping scheme;
    defining at least one transfer channel that is dedicated to carrying transfer frames that are broadcast by the main node;
    configuring non-acquired nodes that are not acquired to the network to enter a connection session by locating the at least one transfer channel to listen for a transfer message, the transfer message indicating a next communications channel that will become active; and
    switching the non-acquired nodes to the next communications channel.

2. The method of claim 1, wherein the non-acquired nodes listen for a beacon frame on the next communications channel, the non-acquired nodes utilizing the beacon frame as a timing reference to enable the non-acquired nodes to acquire the network.

3. The method of claim 2, wherein the beacon frame includes fields as follows:
    a) total number of transfer channels field indicating how many transfer channels exist;
    b) transfer channel number field indicating which channels within the network represent transfer channels; and
    c) priority access number range indicating a range of priority access numbers associated with nodes that are authorized to communicate over the network during a super-frame associated with the beacon frame.

4. The method of claim 1, wherein the channel hopping scheme is a direct sequence spread spectrum (DSSS) chip set selection scheme, the communications channels and the at least one transfer channel defined by mutually orthogonal DSSS chip sets using a single constant carrier wave frequency.

5. The method of claim 4, wherein the main node sends the transfer message using a transfer channel chip set, the transfer message indicating a next communications channel chip set, the next communications channel chip set designated in the DSSS chip set selection scheme as the next communications channel in the network.

6. The method of claim 1, further comprising defining at least two transfer channels, the main node transmitting transfer messages alternately over each of the transfer channels.

7. The method of claim 6, further comprising acquired nodes that are currently acquired to the network, the acquired nodes continue the connection session by alternately locating each of the transfer channels to receive the transfer messages and switch to each next communications channel to continue communicating with other nodes in the network.

8. The method of claim 1, wherein the transfer message includes a communications channel number field indicating a number for the next communications channel to become active.

9. The method of claim 1, wherein the channel hopping scheme is under direction of the main node.

10. The method of claim 1, wherein a first transfer channel is defined for use between the main node and parent nodes, and a different second transfer channel is defined for use between the parent nodes and children nodes.

11. The method of claim 1, wherein the transfer message indicates the next communications channel associated with a next super-frame that is initiated by a beacon frame.

12. The method of claim 1, wherein the defining includes defining the main node in a first tier, repeater nodes in a second tier, and end nodes in a third tier, each end node being associated with one of the repeater nodes, the method further comprising providing priority access (PA) numbers to repeater nodes in the second tier, causing end nodes to inherit the PA number of the associated repeater node, and utilizing the PA numbers to control access to the network.

13. The method of claim 1, wherein the at least one transfer channel is used only to communicate frequency hopping and security parameters.

14. A wireless sensor network, comprising:
    a main node, the main node configured to define communications channels over which the main node communicates with nodes based on a channel hopping scheme, and to define at least one transfer channel that is dedicated to carrying transfer frames that are broadcast by the main node, the main node configured to transmit the transfer frames, each of which indicates a next communications channel, the main node configured to transmit a beacon frame over the next communications channel; and non-acquired nodes associated with sensors, the non-acquired nodes are not acquired to the network, the non-acquired nodes configured to enter a connection session by locating the transfer channel to listen for the transfer frame, the non-acquired nodes configured to switch to the next communications channel and listen for the beacon frame, the non-acquired nodes configured to utilize the beacon frame as a timing reference to enable the non-acquired nodes to acquire the network.

15. The network of claim 14, wherein the channel hopping scheme is a direct sequence spread spectrum (DSSS) chip set selection scheme, the communications channels and the at least one transfer channel defined by mutually orthogonal DSSS chip sets using a single constant carrier wave frequency.

16. The network of claim 15, wherein the main node defines at least two transfer channel chip sets and transmits transfer frames alternately over each of the transfer channel chip sets.

17. The network of claim 15, wherein the nodes are configured to switch to the next communications channel chip set designated by the main node in the transfer frame and to listen for a beacon frame sent by the main node using the next communications channel chip set.

18. The network of claim 15, wherein the main node directs the DSSS chip set selection scheme.

19. The network of claim 15, wherein a first transfer channel chip set is defined for use between the main node and parent nodes, and a different second transfer channel chip set is defined for use between the parent nodes and children nodes.

20. The network of claim 15, wherein the transfer frame indicates the next communications channel chip set associated with a next super-frame that is initiated by the beacon frame.

21. The network of claim 14, wherein the beacon frame includes fields as follows:
 a) total number of transfer channels field indicating how many transfer channels exist;
 b) transfer channel number field indicating which channels within the network represent transfer channels; and
 c) priority access number range indicating a range of priority access numbers associated with nodes that are authorized to communicate over the network during a super-frame associated with the beacon frame.

22. The network of claim 14, wherein the transfer frame includes a communications channel number field indicating a number for the next communications channel to become active.

23. The network of claim 14, further comprising acquired nodes that are acquired to the network, wherein the non-acquired nodes and acquired nodes use the beacon frame to perform collision free beacon scheduling.

24. The network of claim 14, wherein the main node represents a first tier, repeater nodes represent a second tier, and end nodes represent a third tier, each end node being associated with one of the repeater nodes, the main node providing priority access (PA) numbers to repeater nodes in the second tier through the beacon frame, the end nodes inheriting the PA number of the associated repeater node, the main node utilizing the PA numbers to control access to the network.

25. The network of claim 14, wherein the at least one transfer channel is used only to communicate frequency hopping and security parameters.

* * * * *